(12) United States Patent
Heite et al.

(10) Patent No.: US 7,595,457 B2
(45) Date of Patent: Sep. 29, 2009

(54) STEERING COLUMN MODULE

(75) Inventors: Volker Heite, Olpe (DE); Klaus Hirschfeld, Ludenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 10 days.

(21) Appl. No.: 12/011,062

(22) Filed: Jan. 24, 2008

(65) Prior Publication Data

US 2008/0142345 A1   Jun. 19, 2008

Related U.S. Application Data

(63) Continuation of application No. PCT/EP2006/007968, filed on Aug. 11, 2006.

(30) Foreign Application Priority Data

Aug. 12, 2005 (DE) ........................ 10 2005 038 145

(51) Int. Cl.
*H01H 9/00* (2006.01)
(52) U.S. Cl. .................................................. 200/61.54
(58) Field of Classification Search ................ 200/4 R, 200/17 R, 18, 61.54, 61.55, 61.56, 61.57; 307/9.1, 10.1, 10.8; 280/775, 778, 779; 439/15, 439/24, 34, 164
See application file for complete search history.

(56) References Cited

U.S. PATENT DOCUMENTS

| | | | | |
|---|---|---|---|---|
| 5,742,014 A * | 4/1998 | Schwartz et al. | .......... | 200/61.27 |
| 5,895,899 A * | 4/1999 | Sano | ........................ | 200/61.54 |
| 5,977,494 A * | 11/1999 | Sano et al. | ................. | 200/61.54 |
| 6,260,431 B1 * | 7/2001 | Yokoyama | .................... | 74/469 |
| 6,441,327 B1 | 8/2002 | Shibata et al. | | |
| 6,501,033 B2 * | 12/2002 | Pastwa et al. | ............ | 200/61.27 |
| 6,583,373 B2 * | 6/2003 | Ketzer et al. | .............. | 200/61.54 |
| 6,624,366 B2 * | 9/2003 | Uchiyama et al. | ......... | 200/61.54 |
| 6,700,219 B2 | 3/2004 | Hirschfeld et al. | | |
| 6,731,020 B2 * | 5/2004 | Burr et al. | ................... | 307/10.1 |
| 7,000,949 B2 * | 2/2006 | Bostic et al. | ................. | 280/779 |
| 7,138,590 B2 * | 11/2006 | Mochizuki | ............... | 200/61.54 |
| 7,180,020 B2 * | 2/2007 | Onoda et al. | .............. | 200/61.54 |
| 2003/0038019 A1 | 2/2003 | Wright et al. | | |
| 2003/0045133 A1 | 3/2003 | Hirschfeld et al. | | |

(Continued)

FOREIGN PATENT DOCUMENTS

DE          44 28 883 C1      12/1995

(Continued)

*Primary Examiner*—Michael A Friedhofer
(74) *Attorney, Agent, or Firm*—Brooks Kushman P.C.

(57) ABSTRACT

A steering column module includes a lever, first and second printed circuit boards, and an electronics unit. The lever has a base next to a steering column and a head away from the column. The lever base includes a primary control which actuates upon the lever being pivoted. The lever head includes a secondary control which actuates upon being manipulated. The first PCB is situated in the lever base and includes a primary switch which cooperates with the primary control to activate a switching function in response to the primary control being actuated. The second PCB is situated in the lever head and includes a secondary switch which cooperates with the secondary control to activate a switching function in response to the secondary control being actuated. The electronics unit is electrically connected to the switches by a wiring harness having plug-in connectors for respectively electrically contacting the switches.

16 Claims, 2 Drawing Sheets

U.S. PATENT DOCUMENTS

2004/0173444 A1 9/2004 Leng
2005/0106913 A1 5/2005 Khoury et al.

FOREIGN PATENT DOCUMENTS

| DE | 101 08 377 C1 | 4/2002 |
| DE | 102 38 269 A1 | 3/2003 |
| EP | 0 763 447 A2 | 3/1997 |
| EP | 0 887 234 A1 | 12/1998 |
| EP | 1 024 055 A1 | 8/2000 |
| EP | 1 090 807 A2 | 4/2001 |
| EP | 1 538 029 A1 | 6/2005 |
| FR | 2 732 284 | 10/1996 |

\* cited by examiner

STEERING COLUMN MODULE

CROSS-REFERENCE TO RELATED APPLICATIONS

This is a continuation of International Application PCT/EP2006/007968, published in German, with an international filing date of Aug. 11, 2006, which claims priority to DE 10 2005 038 145.6, filed Aug. 12, 2005, the disclosures of which are both hereby incorporated by reference.

BACKGROUND OF THE INVENTION

1. Field of the Invention

The present invention relates to a vehicle steering column module having a lever switch and an electronics unit in which the lever switch includes primary switching elements at its end next to a steering column which are actuated by pivoting the lever switch and secondary switching elements at its end away from the steering column which are actuated by control elements located at that location and in which the electronics unit is electrically connected to the vehicle onboard electrical system and to the switching elements.

2. Background Art

A steering column module in a vehicle implements various functions such as travel direction display, washer-wiper processes, signal transmission, steering angle detection, etc. As such, a steering column module includes various functional components such as a spring cassette for supplying power and transmitting signals to the steering wheel, a steering angle sensor for detecting the steering angle, and lever switches associated with various operating functions such as turn signal indicator, light switching, windshield wiping/washing, etc. Another functional component such as an electronics unit contains output, evaluation, and control electronics for the other functional components. The electronics unit connects the other functional components to an onboard electrical system of the vehicle.

DE 101 08 377 C1 (corresponding to U.S. Pat. No. 6,700,219) describes a steering column module in which lever switches and other functional components are electrically connected to an onboard electrical system via an electronics unit. The electrical connection of the functional components to the electronics unit is achieved by plug-in connectors which engage with one another when an associated housing is joined together. Because of the variation in housing shapes of the functional components, plug-in connectors which are complicated and correspondingly expensive to manufacture may be required. In addition, for many functional components there is little clearance space for positioning the plug-in connectors. Consequently, full use of the installation space on the printed circuit board of the electronics unit is not made.

SUMMARY OF THE INVENTION

An object of the present invention includes a steering column module which can be produced at relatively low cost while retaining a compact structure to allow relatively better use of printed circuit board surfaces.

In carrying out the above object and other objects, the present invention provides a steering column module for a vehicle. The steering column module includes a lever switch, first and second printed circuit boards, and an electronics unit. The lever switch has a base region next to a steering column and a head region away from the steering column. The base region of the lever switch includes a primary control element which actuates upon the lever switch being pivoted. The head region of the lever switch includes a secondary control element which actuates upon being manipulated. The first printed circuit board ("PCB") is situated in the base region of the lever switch and includes a primary switching element which cooperates with the primary control element to activate a switching function in response to the primary control element being actuated. The second PCB is situated in the head region of the lever switch and includes a secondary switching element which cooperates with the secondary control element to activate a switching function in response to the secondary control element being actuated. The electronics unit is electrically connected to an onboard electrical system of the vehicle. The electronics unit is electrically connected to the primary and secondary switching elements by a wiring harness having plug-in connectors for respectively electrically contacting the switching elements.

Further, in carrying out the above object and other objects, the present invention provides a steering column module for a vehicle. The steering column module includes a lever switch having a base region next to a steering column and a head region away from the steering column. A first PCB is situated in the base region of the lever switch and includes a primary switching element which activates a switching function in response to the lever switch being pivoted. A second PCB is situated in the head region of the lever switch and includes a secondary switching element which activates a switching function in response to the head region of the lever switch being manipulated. An electronics unit is electrically connected to the primary and secondary switching elements by a wiring harness having plug-in connectors for respectively electrically contacting the switching elements.

Also, in carrying out the above object and other objects, the present invention provides a steering column module for a vehicle. The steering column module includes a lever switch, first and second PCBs, an electronics unit, and a wiring harness. The lever switch has a base region next to a steering column and a head region away from the steering column. The first PCB is situated in the base region of the lever switch and includes a primary contact surface which is activated in response to the lever switch being pivoted. The second PCB is situated in the head region of the lever switch and includes a secondary contact surface which is activated in response to the head region of the lever switch being manipulated. The wiring harness has plug-in connectors for respectively electrically contacting the primary and secondary contact surfaces. The wiring harness is electrically connected to the electronics unit such that the electronics unit is electrically connected to the primary and secondary contact surfaces.

In accordance with embodiments of the present invention, the primary and secondary switching elements and the electronics unit each have a printed circuit board which at one of its edge regions has printed circuit sections designed as contact surfaces. The switching elements are connected to the electronics unit by a wiring harness provided with plug-in connectors for contacting these contact surfaces.

In accordance with embodiments of the present invention, the steering column module includes a wiring harness having a respective plug-in connector on the sides of the primary and secondary switching elements and a common plug-in connector on the side of the electronics unit. This enables the steering column module to be economical and easy to install.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Figure 1:
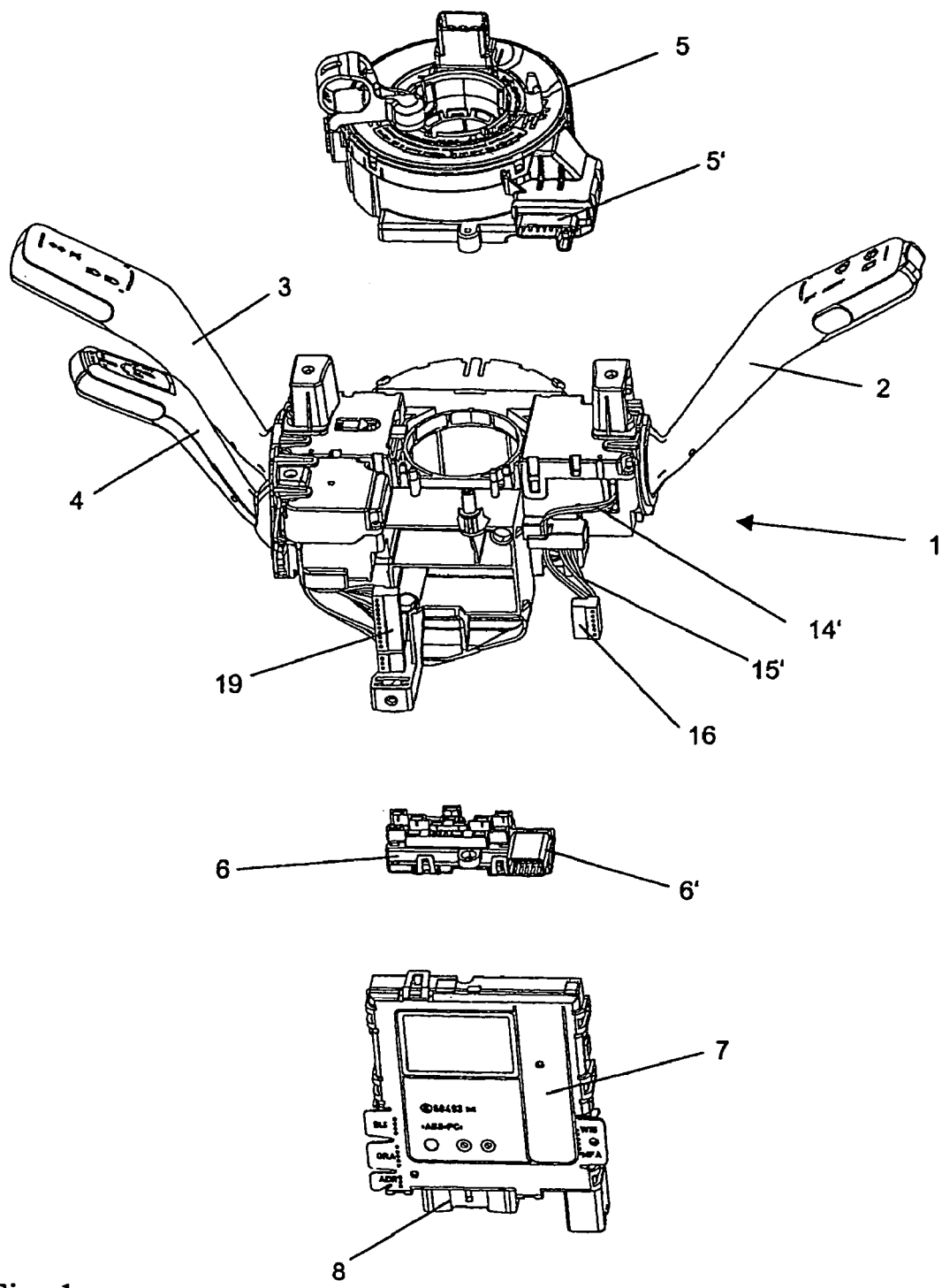
FIG. 1 illustrates an exploded view of a steering column module in accordance with an embodiment of the present invention.

Referring now to FIG. 1, a steering column module in accordance with an embodiment of the present invention is shown. The steering column module includes a support unit 1 which functions as the base of the steering column module. Support unit 1 is directly fixed to the steering column of a vehicle via fasteners.

The steering column module further includes three lever switches 2, 3, 4. Lever switches 2, 3, 4 are mechanically connected to support unit 1. Lever switch 2 is a windshield wiper switch, lever switch 3 is a directional turn signal switch, and lever switch 4 is a cruise control switch.

The steering column module further includes various functional components such as a volute spring cassette 5, a steering angle sensor 6, and an electronics unit 7. Each functional component 5, 6, 7 is mechanically fastened to support unit 1 and is thereby a fixed component of the steering column module.

Lever switches 2, 3, 4, spring cassette 5, and steering angle sensor 6 are electrically connected to the onboard electrical system of the vehicle via electronics unit 7. Lever switches 2, 3, 4 are electrically connected to electronics unit 7 via respective portions of a wiring harness. Spring cassette 5 is electrically connected directly to electronics unit 7 via a plug-in connector 5' of spring cassette 5. Similarly, steering angle sensor 6 is electrically connected directly to electronics unit 7 via a plug-in connector 6' of steering angle sensor 6. Electronics unit 7 includes a plug-in connector 8 to which a portion of the wiring harness joined to the onboard electrical system is connected in order to electrically connect electronics unit 7 to the onboard electrical system.

Each lever switch 2, 3, 4 may include two different types of actuating mechanisms. Regarding the first actuating mechanism type, each lever switch 2, 3, 4 may swivel about an axis. By this type of actuation, switching functions provided by primary switching elements located in the base region of a lever switch 2, 3, 4 next to the steering column may be activated. Regarding the second actuating mechanism type, each lever switch 2, 3, 4 may have actuating elements situated in the head region of the lever switch away from the steering column. An actuating element (i.e., control switching element) of a lever switch 2, 3, 4 cooperates with a correspondingly designed secondary switching element situated in the head region of the lever switch to activate a switching function provided by the secondary switching element.

The primary and secondary switching elements may have many types of designs such as micro-switches, dome switching elements, or sliding contacts which are movable to cooperate with contact surfaces or resistance paths applied to a circuit substrate. Such contact surfaces or resistance paths applied to the circuit substrate function as fixed contacts for the movable contacts.

A common feature of each switching element of a lever switch is that a circuit substrate such as a printed circuit board is located in the corresponding head or base region of the lever switch and is associated with a switching function to be performed at that location. The circuit substrate includes at least a portion of the corresponding switching element.

Figure 2:
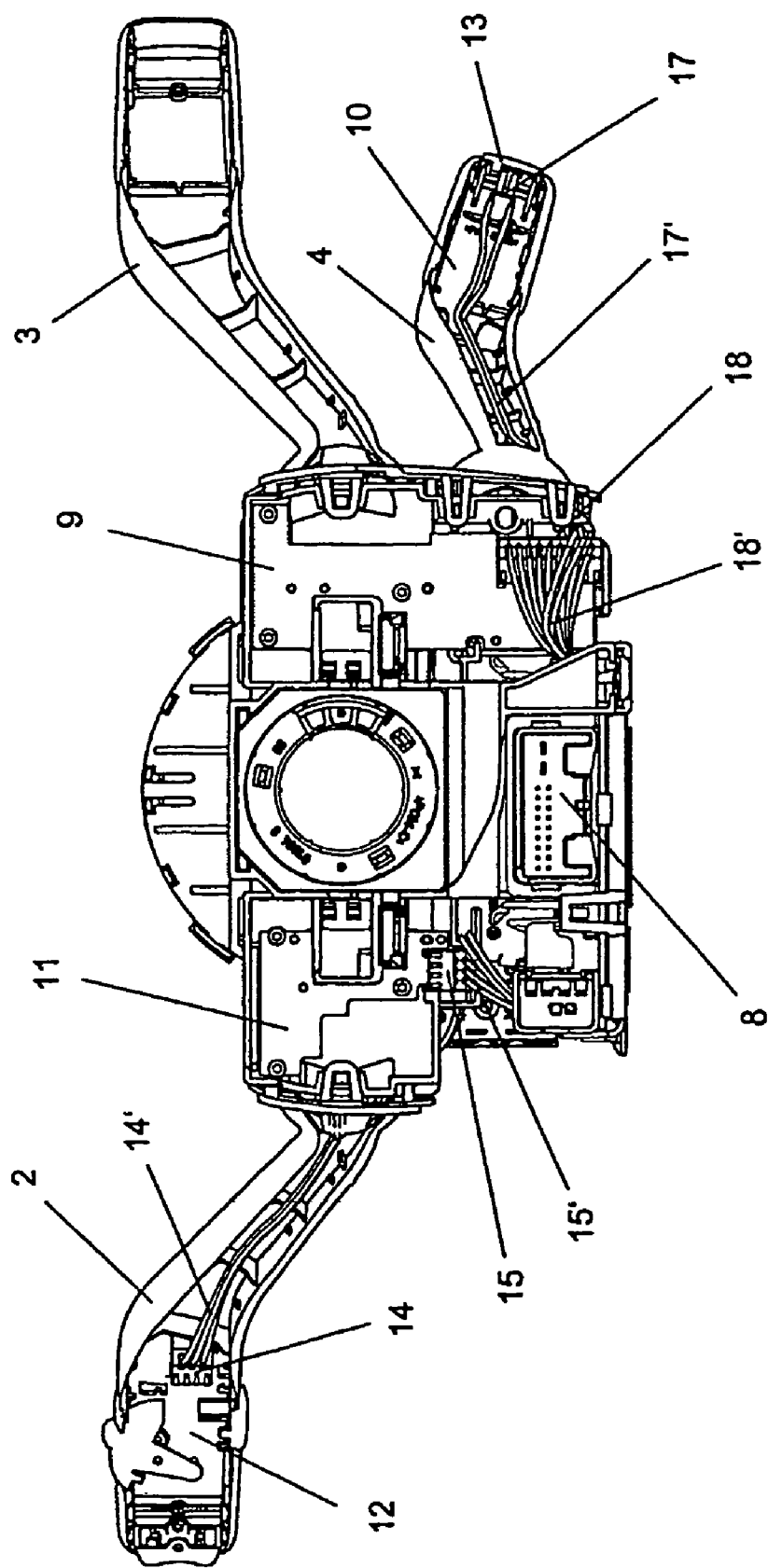
FIG. 2 illustrates a bottom view of the steering column module in which the lever switches are partially opened.

Referring now to FIG. 2, with continual reference to FIG. 1, a bottom view of the steering column module in which lever switches 2, 3, 4 are partially opened is shown. A first printed circuit board ("PCB") 9 is situated in the base regions of lever switches 3, 4 (i.e., directional turn signal switch 3 and cruise control switch 4). PCB 9 is associated with the switching functions to be performed at the base regions of lever switches 3, 4. PCB 9 accommodates primary switching elements of lever switches 3, 4. To this end, PCB 9 includes fixed contacts on its top side. In this embodiment, the fixed contacts are contact surfaces on PCB 9 which are contacted by multi-finger wipers connected to lever switches 3, 4 for achieving the corresponding switching functions when the corresponding lever switch is pivoted. The multi-finger wipers connected to lever switches 3, 4 are movable contacts. The fixed contacts and the movable contacts of each lever switch 3, 4 represent primary switching elements of the lever switch.

A second PCB 10 is situated in the head region of lever switch 4. PCB 10 is associated with the switching functions to be performed at the head region of lever switch 4. PCB 10 accommodates secondary switching elements of lever switch 4. These secondary switching elements are actuated by corresponding control elements (e.g., a pushbutton 13) located at the head region of lever switch 4. These secondary switching elements may be in the form of fixed contacts on PCB 10.

A third PCB 11 is situated in the base region of lever switch 2 (i.e., windshield wiper switch 2). PCB 11 is associated with the switching functions to be performed at the base region of lever switch 2. PCB 11 accommodates primary switching elements of lever switch 2. PCB 11 includes fixed contacts for movable contacts of lever switch 2. Similar to PCB 9 and lever switches 3, 4, the fixed contacts and the movable contacts represent primary switching elements of lever switch 2.

A fourth PCB 12 is situated in the head region of lever switch 2. PCB 12 is associated with the switching functions to be performed at the head region of lever switch 2. PCB 12 accommodates secondary switching elements of lever switch 2. These secondary switching elements are actuated by corresponding control elements located at the head region of lever switch 2. These secondary switching elements may be in the form of fixed contacts on PCB 12.

The portions of the switching elements associated with PCB 9, 10, 11, 12 are electrically connected to electronics unit 7 via respective portions of a wiring harness provided with plug-in connectors for contacting the portions of the switching elements. Such plug-in connectors are designed as card edge connectors in which their mating plug-in contact is formed by a correspondingly designed contact surface on a PCB. The corresponding designed contact surface on a PCB may include a fixed contact of the PCB or may be another contact surface on the PCB which is electrically connected via the PCB to the fixed contact on the PCB. To this end, PCBs 9, 10, 11, 12 include contact surfaces at one of their edge regions which are suitable for electrically contacting the plug-in connectors of the wiring harness.

The portion of the wiring harness associated with windshield wiper lever 2 includes a plug-in connector 14 which contacts PCB 12 in the head region of lever 2. The portion of the wiring harness associated with lever 2 further includes a plug-in connector 15 which contacts PCB 11 in the base region of lever 2. Electrical lines 14', 15' respectively leading away from plug-in connectors 14, 15 lead to a common plug-in connector 16. Common plug-in connector 16 is likewise designed as a card edge connector for contacting a PCB of electronics unit 7.

Similarly, another portion of the wiring harness is situated on the directional turn signal and cruise control side of the steering column module. This portion of the wiring harness includes a plug-in connector 17 which contacts PCB 10 in the head region of cruise control switch 4 and a plug-in connector 18 which contacts PCB 9 in the common base region of switches 3, 4. Electrical line 17' leading away from plug-in connector 17 at PCB 10 in the head region of cruise control switch 4 and electrical line 18' leading away from plug-in connector 18 at PCB 9 in the common base region of switches 3, 4 lead to a common plug-in connector 19. Common plug-in connector 19 is likewise designed as a card edge connector for contacting the PCB of electronics unit 7.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A steering column module for a vehicle, the steering column module comprising:
    a lever switch having a base region next to a steering column and a head region away from the steering column, wherein the base region of the lever switch includes a primary control element which actuates upon the lever switch being pivoted, wherein the head region of the lever switch includes a secondary control element which actuates upon being manipulated;
    a first printed circuit board situated in the base region of the lever switch, wherein the first printed circuit board includes a contact surface and a primary switching element electrically connected to the contact surface of the first printed circuit board, wherein the primary switching element cooperates with the contact surface of the first printed circuit board to activate a switching function in response to the primary control element being actuated;
    a second printed circuit board situated in the head region of the lever switch, wherein the second printed circuit board includes a contact surface and a secondary switching element electrically connected to the contact surface of the second printed circuit board, wherein the secondary switching element cooperates with the contact surface of the second printed circuit board to activate a switching function in response to the secondary control element being actuated;
    an electronics unit electrically connected to an onboard electrical system of the vehicle; and
    a wiring harness having a first plug-in connector, a second plug-in connector, and a common plug-in connector, wherein the first plug-in connector mechanically and electrically directly contacts the contact surface of the first printed circuit board, the second plug-in connector mechanically and electrically directly contacts the contact surface of the second printed circuit board, and the common plug-in connector is connected to the electronics unit such that the electronics unit is electrically connected to the primary and secondary switching elements by the wiring harness.

2. The steering column module of claim 1 wherein:
    the contact surface of the first printed circuit board is at an edge region of the first printed circuit board and the contact surface of the second printed circuit board is at an edge region of the second printed circuit board.

3. The steering column module of claim 1 further comprising:
    a support unit, wherein the lever switch and the electronics unit are fixed to the support unit, wherein the support unit is mechanically fixable to the steering column.

4. The steering column module of claim 1 wherein:
    the support unit accommodates additional functional steering column module components including at least one of a spring cassette and a steering angle sensor.

5. The steering column module of claim 1 wherein:
    the primary control element includes a wiper.

6. The steering column module of claim 1 wherein:
    the secondary control element includes a pushbutton.

7. A steering column module for a vehicle, the steering column module comprising:
    a lever switch having a base region next to a steering column and a head region away from the steering column;
    a first printed circuit board situated in the base region of the lever switch, wherein the first printed circuit board includes a contact surface and a primary switching element electrically connected to the contact surface of the first printed circuit board, wherein the primary switching element cooperates with the contact surface of the first printed circuit board to activate a switching function in response to the lever switch being pivoted;
    a second printed circuit board situated in the head region of the lever switch, wherein the second printed circuit board includes a contact surface and a secondary switching element electrically connected to the contact surface of the second printed circuit board, wherein the secondary switching element cooperates with the contact surface of the second printed circuit board to activate a switching function in response to the head region of the lever switch being manipulated;
    an electronics unit; and
    a wiring harness having a first plug-in connector, a second plug-in connector, and a third plug-in connector, wherein the first plug-in connector mechanically and electrically directly contacts the contact surface of the first printed circuit board, the second plug-in connector mechanically and electrically directly contacts the contact surface of the second circuit board, and the common plug-in connector is connected to the electronics unit such that the electronics unit is electrically connected to the primary and secondary switching elements by the wiring harness.

8. The steering column module of claim 7 wherein:
    the contact surface of the first printed circuit board is at an edge region of the first printed circuit board and the contact surface of the second printed circuit board is at an edge region of the second printed circuit board.

9. The steering column module of claim 7 further comprising:
    a support unit, wherein the lever switch and the electronics unit are fixed to the support unit, wherein the support unit is mechanically fixable to the steering column.

10. The steering column module of claim 7 wherein:
    the support unit accommodates additional functional steering column module components including at least one of a spring cassette and a steering angle sensor.

11. The steering column module of claim 7 wherein:
the primary switching element activates a switching function in response to the lever switch being pivoted such that a wiper of the lever switch activates the primary switching element.

12. The steering column module of claim 7 wherein:
the secondary switching element activates a switching function in response to the lever switch being manipulated such that a pushbutton of the lever switch activates the secondary switching element.

13. A steering column module for a vehicle, the steering column module comprising:
a lever switch having a base region next to a steering column and a head region away from the steering column;
a first printed circuit board situated in the base region of the lever switch, wherein the first printed circuit board includes a primary contact surface which is activated in response to the lever switch being pivoted;
a second printed circuit board situated in the head region of the lever switch, wherein the second printed circuit board includes a secondary contact surface which is activated in response to the head region of the lever switch being manipulated;
an electronics unit; and
a wiring harness having a first plug-in connector, a second plug-in connector, and a common plug-in connector, wherein the first plug-in connector mechanically and electrically directly contacts the primary contact surface, the secondary plug-in connector mechanically and electrically directly contacts the secondary contact surface, and the common plug-in connector is connected to the electronics unit such that the electronics unit is electrically connected to the primary and secondary contact surfaces by the wiring harness.

14. The steering column module of claim 13 further comprising:
a support unit, wherein the lever switch and the electronics unit are fixed to the support unit, wherein the support unit is mechanically fixable to the steering column.

15. The steering column module of claim 13 wherein:
the support unit accommodates additional functional steering column module components including at least one of a spring cassette and a steering angle sensor.

16. The steering column module of claim 13 wherein:
the primary contact surface is at an edge region of the first printed circuit board and the secondary contact surface is at an edge region of the second printed circuit board.

* * * * *